Jan. 13, 1959  E. L. DECKER  2,868,496
VALVE ACTUATING MECHANISM
Filed Jan. 5, 1956  2 Sheets-Sheet 1

INVENTOR.
EDMOND L. DECKER
BY
*Jennings E. Carter*
ATTORNEYS

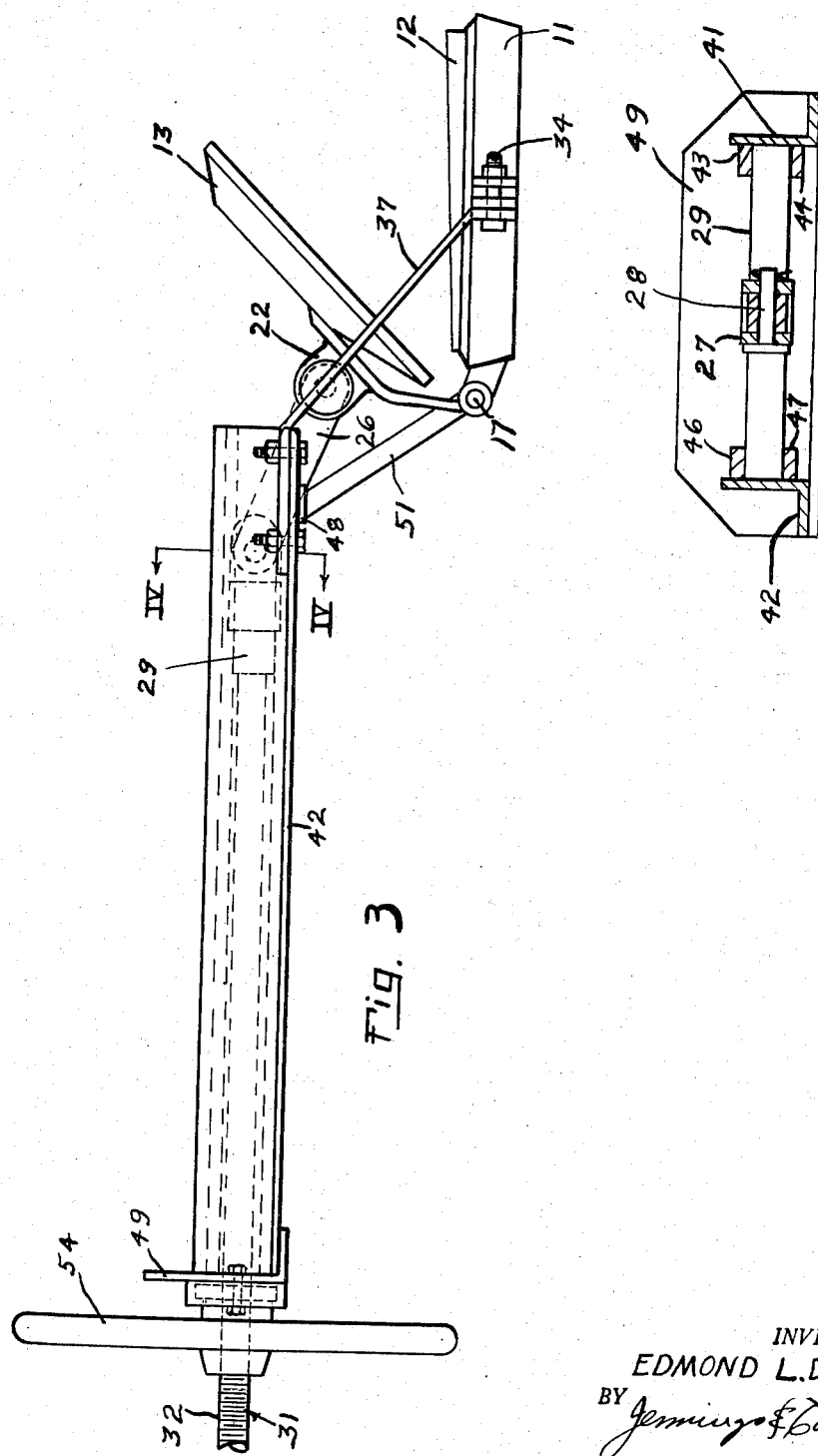

2,868,496

VALVE ACTUATING MECHANISM

Edmond L. Decker, Birmingham, Ala., assignor to Southern Car and Manufacturing Company, a corporation of Alabama Application January 5, 1956, Serial No. 557,604

2 Claims. (Cl. 251—147)

This invention relates to valve actuating mechanism and more particularly to mechanism for actuating the valve plate of a hinge-type valve.

An object of my invention is to provide mechanism for actuating the valve plate of a hinge valve whereby the valve plate may be moved to opened and seated positions regardless of the direction of flow of fluid through the valve.

Another object of my invention is to provide valve actuating mechanism of the character designated in which the valve plate may be held in selected positions between fully opened position and seated position.

A further object of my invention is to provide mechanism for actuating a hinge valve having a valve plate pivotally connected at one side thereof which shall include improved means for supporting the actuating mechanism from the hinge valve.

A still further object of my invention is to provide valve actuating mechanism of the character designated which shall be simple of construction, economical of manufacture and which shall be adapted for installation on conventional type conduits, such as corrugated pipe, and pipe having bell and spigot ends.

Briefly, my improved actuating mechanism for a hinge type valve comprises an actuating member connected to the valve plate of the valve and adapted to move the same about its pivotal connection toward opened and seated positions. A second actuating member is operatively connected to the first mentioned actuating member and is supported for substantially rectilinear movement in spaced relation to the valve.

Apparatus illustrating features of my invention is shown in the accompanying drawings forming a part of this application, in which:

Fig. 3 is a side elevational view, partly broken away, showing the valve plate in open position; and, Fig. 4 is a sectional view taken generally along the line IV—IV of Fig. 3.

Figure 1:
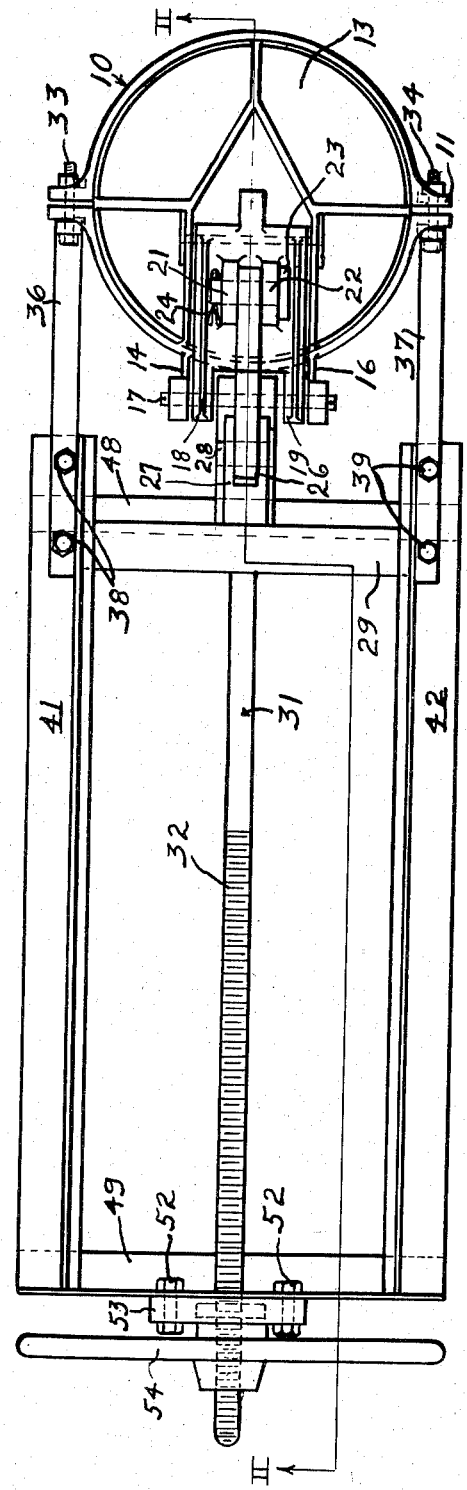
Fig. 1 is a plan view.

Referring now to the drawings for a better understanding of my invention, I show a hinge valve 10 comprising a clamping ring 11, a seating ring 12 and a hinge plate 13. Projecting outwardly from the clamping ring 11 are spaced brackets 14 and 16 having suitable openings in the outer ends thereof for receiving a pivot pin 17. The valve plate 13 is provided with rearwardly extending lugs 18 and 19 having suitable openings therethrough for receiving the pivot pin 17, as shown in Fig. 1, whereby the valve plate is pivotally connected to the clamping ring 11.

Upwardly projecting lugs 21 and 22 are provided on the valve plate 13 and are provided with suitable openings for receiving a transverse pin 23 which is locked in place by means of a cotter key 24. Extending between the lugs 21 and 22 and pivotally connected to the pin 23 is one end of a link 26. The other end of the link 26 is pivotally connected to a clevis 27 by means of a pin 28. The clevis 27 is secured to, or formed integrally with, a transverse member 29. Secured to the transverse member 29 and extending at substantially right angles thereto is the inner end of an actuating rod 31 having a threaded outer end 32.

Figure 2:
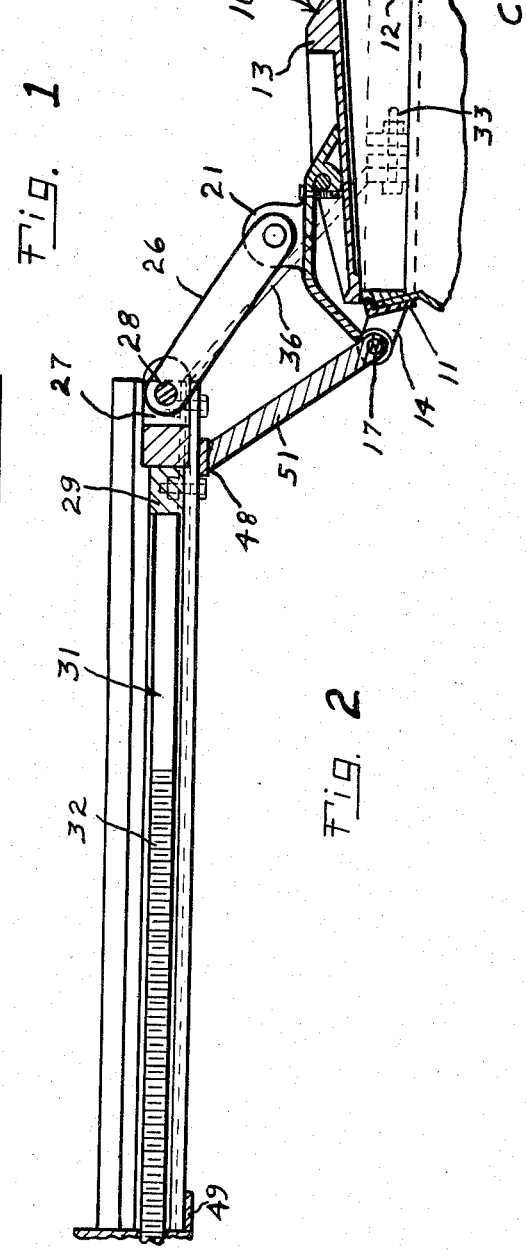
Fig. 2 is a sectional view, partly broken away, taken generally along the line II—II of Fig. 1.

Secured to the clamp ring 11 by means of bolts 33 and 34 are upwardly and rearwardly extending support members 36 and 37 which are positioned at opposite sides of the hinge valve, as shown in Fig. 1. Secured to the upper ends of the members 36 and 37 by means of bolts 38 and 39 are rearwardly extending angle members 41 and 42, respectively. As shown in Fig. 1, the angle members 41 and 42 extend along opposite sides of and substantially parallel to the rod 31. Secured to the inner surface of the angle member 41, as shown in Fig. 4, are longitudinally extending guide members 43 and 44 which are spaced vertically from each other a distance to receive the adjacent end of the transverse member 29 with a sliding fit. In like manner, secured to the inner surface of the angle 42 are longitudinally extending guide members 46 and 47 which are spaced vertically from each other a distance to slidably receive the adjacent end of the transverse member 29. Connecting the forward and rear ends, respectively, of the angles 41 and 42 are cross members 48 and 49. Secured rigidly to the forward cross member 48, by any suitable means such as by welding, is a downwardly and forwardly extending brace member 51 which is pivotally connected at its lower end to the pivot pin 17, as shown in Figs. 2 and 3, thereby forming a rigid connection between the angles 41 and 42 and the hinge valve 10.

Secured to the rear cross member 49 by means of bolts 52 is a bearing 53. Mounted for rotation in the bearing 53 is an actuating member 54 which is in threaded engagement with the threaded end 32 of the rod 31, as shown.

From the foregoing description, the operation of the valve actuating mechanism shown in Figs. 1, through 4, will be readily understood. The seating ring 12 is positioned within the conduit, indicated generally at C, and the clamping ring 11 is placed about the conduit and secured in place by the bolts 33 and 34 which in turn secure the members 36 and 37 rigidly to the clamping ring, as shown in Fig. 2. With the actuating mechanism and the hinge valve 10 thus connected to the conduit C, the actuating member 54 is rotated in the desired direction to cause the rod 31 to move axially whereby the link 26 moves the valve plate 13 about the pivot pin 17 to open and closed positions or any desired position between fully opened position and closed position.

From the foregoing description, it will be seen that I have devised improved mechanism for actuating a hinge valve which may be employed to regulate the flow of fluid regardless of the direction of travel thereof. Also, by providing means for locking the valve plate of the hinge valve in selected positions, the rate of flow may be readily controlled. In actual practice, I have found that my valve actuating mechanism is satisfactory in every respect and may be readily applied to conventional type conduits.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In a valve mechanism for the end of a conduit, a seating ring positioned around the inner circumference of the end of the conduit and extending outwardly therefrom, a clamping ring extending around the outer circumference of the conduit end to clamp the conduit end tightly about the seating ring therein, a valve plate pivotally connected at one side thereof and seated on the outer end of the seating ring for closing said conduit end, a link pivotally connected at one end to said plate and adapted to move said plate about its pivotal connection to opened and seated positions, an actuating rod connected at one end to the other end of said link, the other end of said rod being threaded, parallel guides along opposite sides of said rod, a transverse member secured to said rod and engaging said guides with a sliding fit whereby said rod is supported in spaced relation to the valve plate and is limited to axial movement, a cross member connecting said guides adjacent said other end of the rod, a bearing member mounted on said cross member, and an actuating member mounted for rotation in said bearing member and in threaded engagement with said other end of the rod whereby said rod is moved axially.

2. The combination with a seating ring positioned around the inner circumference of a conduit end and extending outwardly therefrom and a clamping ring extending around the outer circumference of the conduit end to clamp the conduit end tightly about the seating ring therein, of a valve actuating mechanism having a valve plate pivotally connected at one side thereof and seated on the outer edge of the seating ring for closing said conduit end, a link pivotally connected at one end to said plate and adapted to move said plate about its pivotal connection to opened and seated positions, an actuating rod having one end connected to the other end of said link, the other end of said actuating rod being threaded, parallel guides extending along opposite sides of said rod and in parallel relation thereto, a transverse member secured to said rod and engaging said guides with a sliding fit whereby said rod is supported for axial movement in spaced relation to the valve plate, support members connected to said guides at one end and to said clamping ring at the other end for supporting the clamping ring at opposite sides thereof, a cross member connecting said guides adjacent said other end of the rod, and an actuating member mounted for rotation on said cross member and in threaded engagement with the threaded end of the rod for moving the rod axially and thereby opening and closing the valve plate.

References Cited in the file of this patent

UNITED STATES PATENTS

| | | |
|---|---|---|
| 482,790 | Giesler | Sept. 20, 1892 |
| 593,198 | Currier | Nov. 9, 1897 |
| 1,368,229 | Chrisman | Feb. 8, 1921 |
| 2,139,505 | Kirgan | Dec. 6, 1938 |

FOREIGN PATENTS

| | | |
|---|---|---|
| 17,188 | Great Britain | of 1909 |
| 207,312 | Switzerland | of 1940 |